Patented Aug. 30, 1938

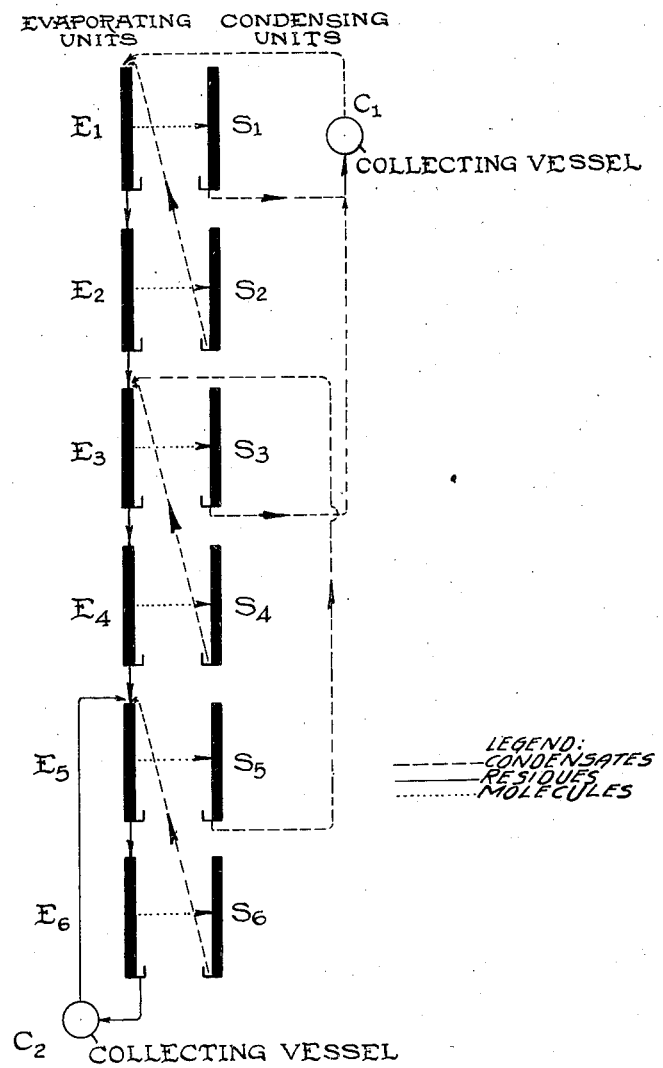

2,128,223

UNITED STATES PATENT OFFICE 2,128,223

FRACTIONAL SHORT-PATH DISTILLATION

Ronald George Juta Fraser, Aylmerton, England, assignor to Imperial Chemical Industries Limited, a corporation of Great Britain Application November 7, 1936, Serial No. 109,773
In Great Britain December 9, 1935

7 Claims. (Cl. 202—52)

This invention relates to the short-path high-vacuum distillation of substances and in particular to fractional distillation of this type by means of an appropriate circulation of residues and condensates in a system comprising a plurality of short-path high-vacuum distillation units, which may if desired be disposed within a single high-vacuum shell. By short-path high-vacuum distillation is to be understood a distillation under a very high-vacuum of the order of $10^{-2}$ to $10^{-6}$ mm. of mercury, and under conditions such that the distilling and condensing surfaces are substantially co-extensive and separated by a distance of not more than a few inches.

In some respects, the present invention may be regarded as an extension or variation of the fractionating system described in Fawcett and McCowen U. S. Patent 2,073,202, in which is described, inter alia, the transference of distillates and residues from one unit to another in countercurrent fashion, and in particular the transfer of condensate from the condensing surface of unit N to the evaporating surface of unit N—1, that from N—1 to N—2, and so on, while the residue from N—2 is passed to the evaporating surface of N—1, that from N—1 to N, and so on.

In the usual form of short-path high-vacuum still, the distilland is fed to a heated evaporating surface, and distils therefrom across a short gap to a relatively cool condensing surface. In the case of a two-component distilland, the more volatile component tends to distil at a higher rate across the gap, the rates of distillation of the two components being approximately in the ratio of their vapour pressures. As the distilland flows over the evaporating surface, the concentration of the more volatile component will diminish, until a point is reached at which the condensate received at that particular point will have practically the composition of the original distilland fed to the evaporating surface. In such operation, therefore, the condensate obtained from the condensing surface does not comprise only the more volatile component, but a product intermediate in composition between that component and the initial two-component distilland.

The object of this invention is to improve upon this method of short-path distillation. A further object is to disclose a method of fractional short-path distillation which will give purer fractions of the mixture under treatment. A further object is to disclose a method which can either be continuous distillation or batch distillation. A further object is to disclose a method which gives good results when it is desired to separate a small body of the pure, more volatile component from a larger body of the less volatile component or to free a body of a desired less volatile component from a more volatile component. A further object is to obviate the difficulty of obtaining effective separation pointed out in the last paragraph. Further objects of this invention will be disclosed or apparent in the following description.

I attain these objects by employing an even number N, being at least 4, of short-path high-vacuum distillation units and I return the condensates from the even numbered units (2, 4, ... N) to the evaporating surfaces of the preceding odd units [1, 3, ... (N—1)] while the condensates from the odd-numbered units, except the first, [3, 5, ... (N—1)] are returned to the evaporating surfaces of the preceding odd units [1, 3, ... (N—3)]. Thus condensates from one set of alternate units go back one unit for redistillation, those from the other set of alternate units go back two units for redistillation. The residues are transferred from one unit to the next in the reverse direction [1 to 2, 2 to 3 ... (N—1) to N]. The condensate from the first unit, and the residue from the last unit, may pass respectively to collecting vessels, which in order to maintain circulation in the system are connected with the evaporating surfaces of the first and (N—1)th units respectively.

In effect, according to the invention there is substituted, for each single unit of the fractionating system described in the aforesaid Fawcett and McCowen patent a double unit, in order to avoid the difficulty previously mentioned. Thus, condensate received from the intermediate point of each "double-unit" is rich in the more volatile component (the dimensions of each portion of the "double-unit" may be chosen so that this is the case) and this rich condensate is fed back to the evaporating surface of the previous double unit, while the condensate received from the second portion of each double unit approximates in composition to the material fed to the evaporating surface of the same double unit and is hence re-fed to that point.

A six-unit system of this type is shown diagrammatically in the accompanying drawing, in which the evaporating ($E_1 \ldots E_6$) and condensing ($S_1 \ldots S_6$) surfaces are shown in thick lines, the paths of the residues by solid lines, and the paths of the condensates by dashed lines. Molecules pass from the evaporating surfaces to the condensing surfaces, as indicated in dotted lines. The actual circuits are as described above and will be clear from the diagram without further description. The placing of the units one above the other has no special significance nor need the units necessarily comprise opposite vertical plates. This system may operate as a batch distillation or as a continuous distillation.

The capacities of the two collecting vessels are preferably chosen in such a way that the collecting vessel in which the pure component, whether condensate or residue, is collected is small compared with the other collecting vessel. The principal object of so doing is to increase the rate of attainment of equilibrium in the system. Thus, when a relatively small body of the desired pure, more volatile component is to be obtained from a larger body of the less volatile component, the capacities of the condensate and residue collecting vessels may correspond more or less to the composition of the mixture to be distilled respectively with reference to condensate and residue components. When a large body of the less volatile (residue) component is desired pure and freed from a relatively small amount of the more volatile (condensate) component, the residue collecting vessel will preferably be made smaller than the condensate collecting vessel and the distillation carried out preferably as a continuous distillation in the manner hereinafter described.

The two collectors $C_1$ and $C_2$ are filled up with the distilland and the circulating system is put into operation as shown in the diagram.

Eventually, after a period of time the vessels $C_1$ and $C_2$ will contain respectively the purest condensate or residue, whichever is initially desired that the apparatus will give. It is then possible to stop and restart with a fresh batch or alternatively the distillation may be effected as a continuous distillation by bleeding the components from $C_1$ and $C_2$ at a suitable rate (depending upon the rate at which equilibrium is reached in the apparatus) and feeding in a corresponding quantity of distilland to any convenient point in the system.

This invention has a number of useful and novel functions, for instance in the treatment of a mixture of free fatty acids and triglycerides, such as often occurs in crude vegetable or animal oils; it being desired to remove the free fatty acids from the triglycerides. In the usual form of short-path high-vacuum still, the mixture would be fed to a heated evaporating surface and would distil therefrom across a short gap to a relatively cool condensing surface. The more volatile component (i. e. the free fatty acids) would tend to distil at a higher rate across the gap, the rates of distillation of this component and the triglycerides component being in the ratio of their vapour pressures divided by the square root of their molecular weights. As the mixture flows over the evaporating surface, the concentration of the free fatty acids will diminish, until a point is reached at which the condensate there obtained will have practically the composition of the original mixture, i. e. the condensate obtained from the condensing surface as a whole will not comprise only the free fatty acids, but a mixture intermediate between such free fatty acids and the original mixture. Thus, although a residue can eventually be obtained of satisfactorily low fatty acid content, there will be a loss of triglycerides in the distillate. By operating the system of the present invention, the yield of triglycerides, etc., is greatly improved.

A further case is that of the concentration into a relatively small distillate fraction of the vitamin 'A' content of e. g. a fish liver oil; in this case, of course, a distillate free from triglycerides, etc., is required.

It will be understood that the temperatures of the evaporating and condensing surfaces of each unit, and the size or separation, or both, of said surfaces may be under independent control. The several units may all be housed within one evacuated vessel providing a common high-vacuum for the system, or each unit may be separately housed and evacuated, and also the pairs of surfaces $E_1$ and $E_2$, $E_3$ and $E_4$, $E_5$ and $E_6$ might be continuous but each pair faced by two separate condensing surfaces $S_1$ and $S_2$, $S_3$ and $S_4$, $S_5$ and $S_6$ respectively. Again, the set of evaporating surfaces $E_1$ to $E_6$ facing the respective condensing surfaces $S_1$ to $S_6$ might be arranged as an extensive single surface, means being provided for delivering the distillates from the separate condensing surfaces to the appropriate points on the evaporating surface.

As many apparently widely different embodiments of this invention may be made without departing from the spirit and scope thereof, it is to be understood that I do not limit myself to the specific embodiments thereof except as defined in the appended claims.

I claim:

1. A process of fractional short-path high-vacuum distillation which comprises using an even number N of at least 4 short-path high-vicuum distillation units and returning the condensates from the even numbered units (2, 4 ... N) to the evaporating surfaces of the preceding odd numbered units (1, 3 ... $\overline{N-1}$) and returning the condensates from the odd numbered units except the first (3, 5 ... $\overline{N-1}$) to the evaporating surfaces of the preceding odd numbered units (1, 3 ... $\overline{N-3}$) while the residues are transferred in the reverse direction from one unit to the next (1—2, 2—3 ... $\overline{N-1}$ to N).

2. A process as claimed in claim 1 in which the condensate from the first unit and the residue from the last unit pass respectively to two collecting vessels, outlets from which are connected respectively with the evaporating surface of the first and the evaporating surface of the penultimate unit.

3. A process as claimed in claim 1, in which the condensate from the first unit, and the residue from the last unit, pass respectively to two collecting vessels; outlets from which are connected respectively with the evaporating surface of the first and the evaporating surface of the penultimate unit; and characterized by the following steps that the process is commenced by filling up both the collecting vessels with the material to be distilled, and putting the system into operation, and continuing the operation until one of the collecting vessels is full of the condensate, or the residue, whichever is sought, in the purest condition that the apparatus will give.

4. A process as claimed in claim 1, in which the condensate from the first unit, and the residue from the last unit, pass respectively to two collecting vessels; outlets from which are connected respectively with the evaporating surface of the first and the evaporating surface of the penultimate unit; and characterized by the following steps that the process is commenced by filling up both the collecting vessels with the material to be distilled, and putting the system into operation, and continuing the operation until one of the collecting vessels is full of the condensate, or the residue, whichever is sought, in the purest condition that the apparatus will give, and rendering the process continuous by bleeding off material from the collecting vessels and feeding in a corresponding quantity of distilland to any convenient point in the system.

5. A process as claimed in claim 1 in which the condensate from the first unit and the residue from the last unit pass respectively to two collecting vessels, outlets from which are connected respectively with the evaporating surface of the first and the evaporating surface of the penultimate unit, and the sizes of the collecting vessels are so adjusted that the vessel for the purest condensate or residue, whichever is sought, is too small to take the whole volume of the condensate or residue which is present in the original distilland.

6. A process as claimed in claim 1, in which the condensate from the first unit, and the residue from the last unit, pass respectively to two collecting vessels; outlets from which are connected respectively with the evaporating surface of the first and the evaporating surface of the penultimate unit; and characterized by the following steps that the process is commenced by filling up both the collecting vessels with the material to be distilled, and putting the system into operation, and continuing the operation until one of the collecting vessels is full of the condensate, or the residue, whichever is sought, in the purest condition that the apparatus will give and the capacities of the collecting vessels are so adjusted that the vessel for the purest condensate or residue, whichever is sought, is small compared with the other collecting vessel.

7. A process as claimed in claim 1, in which the condensate from the first unit, and the residue from the last unit, pass respectively to two collecting vessels; outlets from which are connected respectively with the evaporating surface of the first and the evaporating surface of the penultimate unit; and characterized by the following steps that the process is commenced by filling up both the collecting vessels with the material to be distilled, and putting the system into operation, and continuing the operation until one of the collecting vessels is full of the condensate, or the residue, whichever is sought, in the purest condition that the apparatus will give and rendering the process continuous by bleeding off material from the collecting vessels and feeding in a corresponding quantity of distilland to any convenient point in the system and the sizes of the collecting vessels are so adjusted that the vessel for the purest condensate or residue, whichever is sought, is too small to take the whole volume of the condensate or residue which is present in the original distilland, and is also small compared with the other collecting vessel.

RONALD GEORGE JUTA FRASER.